United States Patent [19]
Gancy et al.

[11] 4,115,219
[45] Sep. 19, 1978

[54] BRINE PURIFICATION PROCESS

[75] Inventors: Alan B. Gancy; Chester J. Kaminski, both of Syracuse, N.Y.

[73] Assignee: Allied Chemical Corporation, Morris Township, Morris County, N.J.

[21] Appl. No.: 822,016

[22] Filed: Aug. 5, 1977

Related U.S. Application Data

[63] Continuation of Ser. No. 653,874, Jan. 30, 1976, abandoned.

[51] Int. Cl.² .............................................. C25B 1/36
[52] U.S. Cl. .................................... 204/99; 423/164; 423/165; 423/186; 423/192; 423/198
[58] Field of Search ............... 423/164, 165, 186, 192, 423/198; 210/46, 51, 52, 53; 204/98, 99, 128

[56] References Cited

U.S. PATENT DOCUMENTS

| | | | |
|---|---|---|---|
| 2,692,816 | 10/1954 | Vettel et al. | 423/164 |
| 2,893,840 | 7/1959 | Vettel et al. | 210/46 |
| 3,089,789 | 5/1963 | Van Note | 210/51 |
| 3,954,580 | 5/1976 | Kaminski et al. | 204/99 |

FOREIGN PATENT DOCUMENTS

| | | | |
|---|---|---|---|
| 828,387 | 8/1975 | Belgium | 423/164 |
| 485,667 | 8/1952 | Canada | 210/46 |

*Primary Examiner*—O. R. Vertiz
*Assistant Examiner*—Wayne A. Langel
*Attorney, Agent, or Firm*—Anthony J. Stewart; Gerard P. Rooney

[57] ABSTRACT

In a process for purifying raw brine containing dissolved strontium, calcium and magnesium impurities wherein the raw brine is treated by contacting the brine with sodium carbonate for precipitation of strontium and calcium carbonate, contacting the brine containing the strontium and calcium carbonate solids with sodium hydroxide for precipitation of magnesium hydroxide, and removing strontium carbonate, calcium carbonate and magnesium hydroxide solids from the sodium chloride brine, the improvement which comprises passing at least a portion of said removed solids to the zone wherein the raw brine is contacted with sodium carbonate.

11 Claims, 1 Drawing Figure

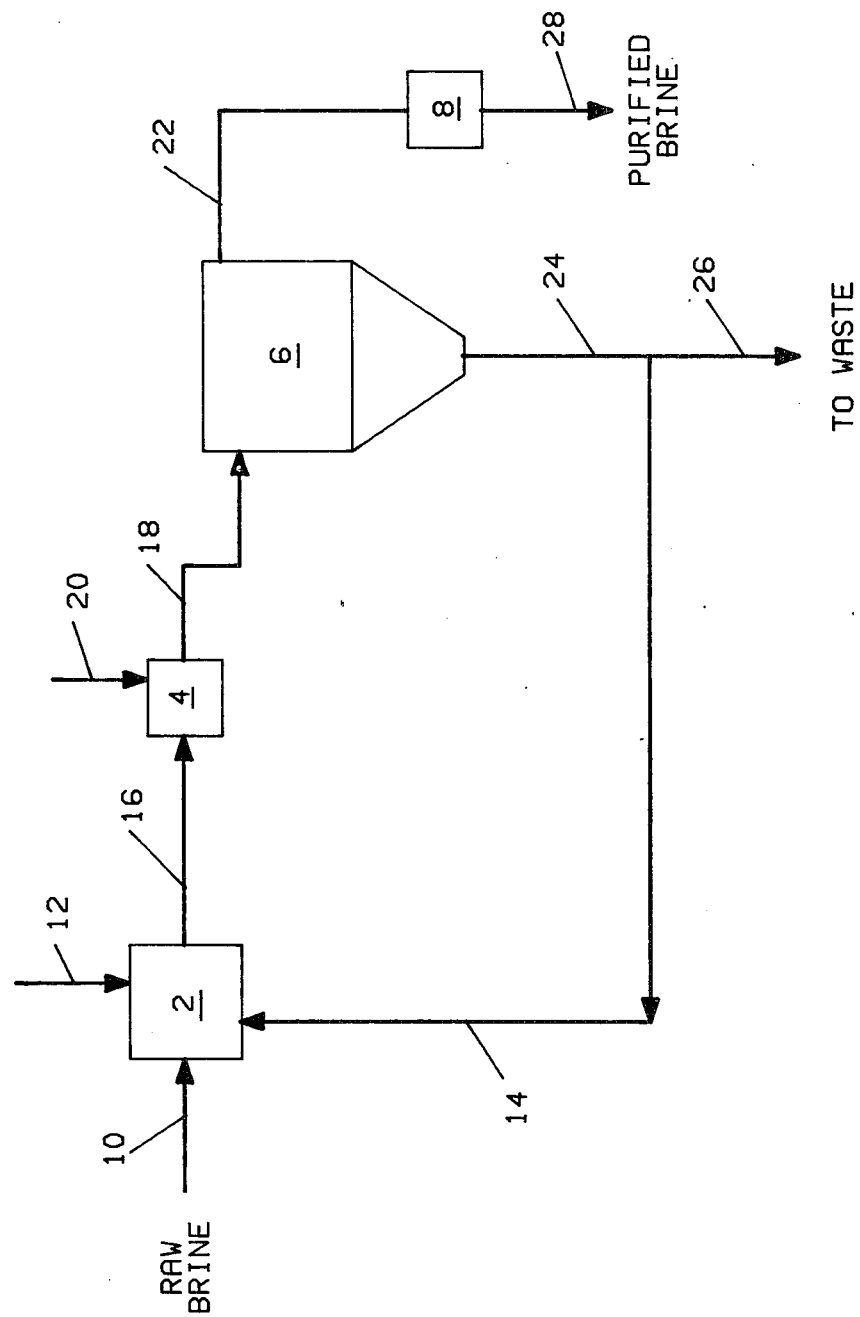

BRINE PURIFICATION PROCESS

This is a continuation of application Ser. No. 653,874 filed Jan. 30, 1976, now abandoned.

BACKGROUND OF THE INVENTION

1. Field of the Invention

This invention relates to the purification of sodium chloride brines and, more specifically, to an improved process for purification of sodium chloride brines containing strontium, calcium and magnesium impurities.

2. Description of the Prior Art

The production of chlorine by the electrolytic decomposition of sodium chloride brines is well known in the art. In order to maximize the efficiency of electrolytic cells, it is desirable to purify the brines prior to electrolysis to remove impurities such as strontium, calcium and magnesium ions which generally exist in raw brines. Thus, removing strontium impurities from brine fed to a mercury electrolytic cell has been found to minimize the formation of "mercury butter", a thick flowing or solid material which is generally formed on the surface of the flowing mercury cathode. See commonly assigned U.S. Pat. No. 3,954,580. Mercury butter is composed chiefly of mercury with small amounts of metallic impurities, mainly iron, and its presence in a mercury electrolytic cell is undesirable since it effects a decrease in current efficiency of the cell and increases the hydrogen content of the chlorine produced by the cell, thereby presenting a safety hazard and reducing the amount of chlorine that can be subsequently liquified from the gases so produced. In addition, purification of the mercury exiting the cell becomes more complex and costly as the amount of mercury butter increases, presenting hygene and pollution problems.

Removal of strontium, calcium and magnesium impurities also minimizes hydrogen evolution and anode wear in other types of electrolytic cells, e.g. diaphragm cells.

Melt refining processes, in which a sodium chloride melt is treated for removal of calcium, magnesium and sulfate impurities, such as that disclosed in U.S. Pat. No. 3,840,651 (issued in 1974 to D. T. Dreland), are uneconomical because of the high energy demands inherent in the process.

The process of Canadian Pat. No. 506,130 (issued in 1954 to D. W. Hengeren), in which sodium carbonate and sodium hydroxide are added to raw brine to form insoluble precipitates of magnesium hydroxide and calcium carbonate and in which the resultant brine and the suspended solids are passed over a bed of sodium chloride for removal of the precipitated impurities, has the disadvantage of requiring handling of large quantities of solid sodium chloride, in removing and replenishing the sodium chloride solids in the bed.

Of the processes which treat aqueous brines without use of such sodium chloride beds, those disclosed in U.S. Pat. Nos. 2,764,472 (issued in 1956 to W. R. Cady et al.); and 3,816,592 (issued in 1974 to F. Rinaldi) are typical. The Cady process treats brines containing dissolved calcium and magnesium chloride and calcium and strontium sulfate by introducing sodium sulfate to precipitate calcium sulfate, and treating the resulting liquid, after removing the calcium sulfate solids, with an alkali metal carbonate and either an alkali metal or alkali earth metal hydroxide to precipitate the carbonate salt of calcium and strontium and magnesium hydroxide. In the Rinaldi process raw brine containing impurities such as Ca, Sr, Ba, Mg, Fe, Al and Ni is mixed with a solution containing $SO_4^{--}$ ions for precipitation of sulfates of calcium and barium, the solids removed and the resulting solution treated with sodium carbonate or carbon dioxide, to precipitate calcium, strontium and barium carbonate followed by treatment with sodium hydroxide for precipitation of the hydroxide of magnesium, iron, aluminum and nickel. A portion of the muds containing the sulfate solids which have been removed following the first stage are returned, in the continuous process, to the first stage. However, the foregoing processes are directed to purification of brines containing substantial quantities of sulfate impurities and are therefore not readily adaptable to purification of brines which do not contain sulfate in substantial quantities. Moreover, in producing brines for use in processes in which the presence of high sulfate levels are not objectionable, these processes are unnecessarily complex and expensive. Finally, they do not achieve the low levels of strontium which has been found desirable in decreasing the formation of mercury butter in the subsequent mercury cell electrolysis of the purified brine.

Of interest also in removal of sulfate from raw brines is U.S. Pat. No. 3,753,900 (issued in 1973 to M. D. Moore).

Another process, herein termed the "$Na_2CO_3$/NaOH process", which is widely used to purify raw brines containing dissolved calcium, magnesium and strontium impurities, involves mixing the raw brine with an alkali metal carbonate, e.g. sodium carbonate, for precipitation of calcium and strontium carbonates, contacting the resulting brine containing carbonate solids with sodium hydroxide for formation of magnesium hydroxide solids, and removing the solids, generally by settling, to provide a liquor which, after optional filtration to remove any residual solids, may be either passed to a crystallizer for recovery of the pure sodium chloride salt or employed as purified brine in subsequent processing. Since the calcium and strontium carbonate solids are extremely difficult to remove by sedimentation even with the use of flocculants, this $Na_2CO_3$/NaOH process has the advantage of facilitating this sedimentation by adding sodium hydroxide to the brine subsequent to the addition of sodium carbonate. The magnesium hydroxide which forms precipitates in the form of flakes which incorporate the calcium and strontium carbonate crystals precipitated in the previous stage. Thus, the calcium carbonate and strontium carbonate crystals rapidly settle along with the magnesium hydroxide precipitate. After purification of raw brine by prior art $Na_2CO_3$/NaOH purification processes, the purified brine (generally containing from about 10 to 30 weight percent sodium chloride together with 1 to 300 ppm impurities) is passed to the electrolysis process. In a brine containing 25 weight percent sodium chloride, these impurities generally comprise from about 0.01 to 1 ppm iron, 0.1 to 30 ppm calcium, 0.1 to 10 ppm magnesium, 0.1 to 10 ppm aluminum and 0.6 to 10 ppm strontium. While concentrations of strontium lower than 0.5 ppm may be obtained by use of raw brine purification techniques such as ion exchange and evaporative crystallization techniques, disclosed in U.S. Pat. 3,954,580, such processes may not readily adapt to commercial purification facilities employing the $Na_2CO_3$/NaOH purification process wherein the raw brine is sequentially contacted with sodium carbonate and sodium hydroxide for impurity precipitation.

A similar process, herein termed the "NaOH/Na₂CO₃" process disclosed in I. Kanno and J. Yoshioka, "Brine Purification by a Sludge Circulation Process", Soda to Enso, 18(8), 274-81 (1967), 69 Chem. Abs. 61404 (1968), involves first adding sodium hydroxide to the raw brine followed by addition of sodium carbonate, passing the resulting liquor to a settling tank for removal of solids and recycle of a portion of the sludge from the settling tank to the vessel in which the raw brine is contacted with sodium hydroxide. The liquor from the settling tank is filtered and passed to an electrolytic cell for use therein. The Kanno et al. process, however, does not have the advantage of rapid settling of the calcium and strontium carbonate crystals due to forming of magnesium hydroxide solids subsequent to the forming of the calcium and strontium carbonate solids.

Other references disclosing brine purification processes are: M. L. Berman, et al., "Reactor-settling Tank for Purifying Brine for the Soda Industry", Vop. Proekt. Sodovykh Zavodov, No. 2, 55-9 (1971), 81 Chem. Abs. 27760g (1974); S. Yoshida et al., Japanese Kokai 74/66,600 (27 June 1974), 81 Chem. Abs. 130203b (1974); Y. Tamura, et al., Japanese Kokai 73/80,498 (27 October 1973), 80 Chem. Abs. 72564m (1974); I. A. Kuzin, et al., Sb. Tr. Kafedra Yad. Fiz. Radiats. Khim., Leningrad, Tekhnol. Inst. im. Lensoveta, No. 2, 3-16 (1971), 80 Chem. Abs. 125284d (1974); British Pat. No. 1,075,167 (issued in 1967 to J. H. Bendle, et al.), 67 Chem. Abs. 83529m (1967); and S. Pribicevic, et al., Glas. Hem. Drus., Beograd, 35(4-6), 363-8 (1970), 68 Chem. Abs. 131095k (1971).

Accordingly, there exists the need for a process which provides improved removal of strontium, calcium and magnesium impurities from brines.

SUMMARY OF THE INVENTION

In accordance with the present invention, an improved process for the purification of raw sodium chloride brines containing dissolved impurities including strontium, calcium and magnesium is provided which comprises (a) contacting the raw brine with sodium carbonate and solids recycled from step (d) for formation of strontium carbonate and calcium carbonate solids, (b) contacting the treated brine containing the carbonate solids with sodium hydroxide for formation of magnesium hydroxide solids, (c) removing a major portion of the strontium carbonate, calcium carbonate and magnesium hydroxide solids to provide a purified brine and (d) recycling a portion of removed solids for admixture with said raw brine and said sodium carbonate.

It has been surprisingly found that a sodium chloride brine having substantially lower quantities of dissolved strontium impurities, and also decreased quantities of dissolved calcium and magnesium impurities can be obtained employing the $Na_2CO_3$/NaOH purification process by contacting the raw brine with sodium carbonate and recycled solids for formation of the carbonate salts of strontium and calcium. Thus, the process of the present invention provides a substantial decrease in the disadvantages, such as the formation of mercury butter and hydrogen evolution, which attend the electrolysis of sodium chloride brines containing strontium, calcium and magnesium impurities.

It has been discovered that a brine containing less than about 1 ppm strontium and preferably less than 0.5 ppm strontium, may be obtained by the process of the present invention. Due to the large tonnages of chlorine produced commercially each year in mercury electrolytic cells, the decreased mercury butter formation effected by the electrolysis of purified brine produced by the process of the present invention represents a substantial cost savings in purification expenses and in loss of mercury during purification, and thus effects a general improvement in cell operation. The prevention of mercury loss also decreases the pollution problems associated with loss of mercury.

DETAILED DESCRIPTION OF THE INVENTION

Raw brines vary widely in composition, both in the sodium chloride content of the brine and in the amount and nature of impurities present in the brine, and generally contain from about 10 to 30 weight percent sodium chloride and from about 100 to 6,000 ppm impurities. Thus, in a raw brine containing 25 weight percent sodium chloride, the raw brine generally also contains as impurities from about 1 to 10 ppm iron compounds (calculated as elemental iron), 100 to 6,000 ppm calcium compounds (calculated as elemental calcium), 10 to 600 ppm magnesium compounds (calculated as elemental magnesium), 1 to 10 ppm aluminum compounds (calculated as elemental aluminum) and from about 1 to 200 ppm strontium compounds (calculated as elemental strontium). Thus, raw brines generally contain from about 1 to 200 ppm strontium, 1 to 10 ppm iron, 100 to 6,000 ppm calcium, 10 to 600 ppm magnesium, 1 to 10 ppm aluminum in addition to 0.1 to 10 ppm of other heavy metal impurities (e.g. nickle and barium), all calculated as the elemental metal.

The instant invention, in its broadest aspects, involves the successive contacting of raw brine containing dissolved strontium, calcium and magnesium impurities (1) with sodium carbonate and recycled solids and (2) then with sodium hydroxide. Thus, the process may be practiced in a single zone and the raw brine may be contacted with the sodium carbonate, recycled solids and sodium hydroxide therein. Also, in its broadest aspects, the present invention includes removal of the strontium carbonate, calcium carbonate, and magnesium hydroxide solids by any means of solids separation conventionally employed to remove solids from liquids, including filtration and centrifuging. However, in the preferred embodiment of the process of the present invention, the raw brine containing the dissolved strontium, calcium and magnesium impurities is contacted in a first treatment zone with sodium carbonate and recycled solids for formation of strontium carbonate and calcium carbonate solids, the resultant brine containing the carbonate solids passed to a second treatment zone wherein the brine is contacted with sodium hydroxide for formation of magnesium hydroxide, the brine containing the strontium carbonate, calcium carbonate and magnesium hydroxide solids is passed to a settling zone wherein solids, and most preferably a major portion thereof, are removed by settling, thereby forming a purified brine, the purified brine withdrawn as product and a portion of the solids removed in the settling zone recycled to the first treatment zone wherein raw brine is contacted with sodium carbonate.

Reference is now made to the accompanying drawing illustrating one embodiment of the process of the present invention. Raw brine containing strontium, calcium and magnesium impurities is fed via line 10 to first treatment zone 2 wherein the brine is contacted, preferably with continuous stirring, with sodium carbonate introduced therein via line 12 and with muds which are introduced to treatment zone 2 via line 14 as recycle from settling zone 6, thereby forming insoluble strontium carbonate and calcium carbonate solids. The liquor containing these solids is withdrawn from first treatment zone 2 via line 16 and passed to second treatment zone 4 wherein the liquor is contacted with sodium hydroxide, which is introduced to zone 4 via line 20, resulting in the formation of magnesium hydroxide solids. Liquor containing strontium carbonate, calcium carbonate and magnesium hydroxide solids is withdrawn from zone 4 via line 18 and passed to settling zone 6 wherein the solids are allowed to separate from the liquor by settling. The settled solids are removed from zone 6 as muds via line 24. A portion of these muds are recycled to zone 2 via line 14 and the remainder is passed to waste via line 26. The clarified liquor, which is substantially free of solids, is removed from zone 6 via line 22 and may be optionally passed to further solids recovery apparatus 8 for removal of any residual solids remaining in the liquor, thereby allowing recovery of purified brine via line 28 from apparatus 8.

The process of the present invention may be operated in either a batch, semi-continuous or continuous manner. However, a continuous operation of the process is preferred for most economical operation. All stages of the purification cycle may be conducted at room temperature, that is, at a temperature which the brines to be naturally found depending on the environmental conditions and the weather conditions. Thus, the optimal processing temperature may be at any temperature between 0° and 50° C.

The raw brine treated in accordance with the process of the present invention may contain sodium chloride in an amount up to the solubility limit for sodium chloride. Thus, the raw brine may contain up to about 27 weight percent sodium chloride for a brine at 50° C. Preferably, the brine contains from about 20 to 27% by weight sodium chloride. This brine may also contain impurities in an amount up to about 6,000 ppm.

The sodium carbonate may be introduced to zone 2 for contact with the raw brine (i.e. the carbonation step) either as solid, as an aqueous solution, or as a slurry comprising a sodium chloride brine saturated with sodium carbonate and containing up to about 50% by weight sodium carbonate solid. When an aqueous sodium carbonate solution is employed, the concentration of sodium carbonate therein may vary up to the solubility limit for sodium carbonate in water. Typically, the aqueous solution will contain from about 5 to 33% by weight, and preferably from about 20 to 33% by weight, dissolved sodium carbonate. The quantity of sodium carbonate employed to contact the raw brine also varies widely depending upon the degree of removal of dissolved strontium, calcium and magnesium impurities desired, the concentrations of these impurities in the brine, the quantity of muds recycled to zone 2 via line 14, the degree of mixing in zone 2 and other factors. Generally, however, sodium carbonate should be employed in an amount equal to that amount stoichiometrically required to react with the quantity of dissolved strontium and calcium contained in the raw brine, and preferably at least about 0.1 gram per liter, and most preferably at least 0.3 gram per liter sodium carbonate in excess of the stoichiometric amount. It has been found that the use of such excesses of sodium carbonate provides even greater removal of strontium, calcium and magnesium impurities dissolved in the raw brine.

The quantity of solids recycled to the zone in which raw brine is contacted therewith, e.g. zone 2 in the accompanying drawing, is not critical and may vary widely. Thus, in the practice of the present invention recycle of from about 25 to 1,000% solids, and most preferably from about 100 to 700% solids is employed. As used herein the term "% solids" is intended to refer to the quantity of solids recycled to the zone in which the raw brine is contacted with these solids and with sodium carbonate, for formation of strontium and calcium carbonate, expressed as a percentage of the total strontium carbonate, calcium carbonate and magnesium hydroxide produced by reaction of the dissolved strontium, calcium and magnesium impurities in the raw brine with the sodium carbonate and sodium hydroxide admixed with the raw brine in accordance with the process of the present invention. Thus, the term "% solids", as applied to the embodiment illustrated in the accompanying drawing, refers to the quantity of solids recycled to zone 2 expressed as a percentage of the quantity of total solids produced (e.g. calcium carbonate, strontium carbonate and magnesium hydroxide) in first treatment zone 2, second treatment zone 4 and settling zone 6 as a result of reaction of dissolved strontium, calcium and magnesium impurities with the sodium carbonate and sodium hydroxide mixed with the brine in the process. The quantity of total solids formed by this reaction for a given brine may be easily determined by routine experimentation. The solids recycled to the carbonation step may be passed as a slurry thereof or as solids. However, a slurry of these solids is preferred for simplicity of operation.

The average retention time of liquor in first treatment zone 2 may vary widely. However, it has been found that most efficient operations occurs when the average retention time of liquor in zone 2 is from about 30 to 120 minutes, for a mixing vessel having a volume of 7,500 gallons.

Sodium hydroxide may be employed to contact the brine containing the carbonate solids (i.e. in second treatment zone 4 in the embodiment illustrated) either as solids or as an aqueous solution containing sodium hydroxide up to its limit of solubility. Generally, when an aqueous solution is employed, it will contain from about 1 to 50 weight percent, and preferably from about 5 to 20 weight percent, sodium hydroxide. While stirring may be employed to admix the brine containing sodium carbonate and calcium carbonate solids with the sodium hydroxide, preferably sodium hydroxide is added without stirring and the resulting liquor passed to settling zone 6 under flow conditions which will not substantially disturb the floc formed as a result of the reaction of the dissolved magnesium solids with sodium hydroxide to form magnesium hydroxide. While it is well within the skill of one having ordinary skill in the art to design a system in which the above flow conditions are provided, it has been found in applicants' practice that these conditions may be readily achieved by employing a single fluid line trough between a first vessel comprising treatment zone 2 and a second vessel comprising settling zone 6. In such an embodiment, passages 16 and 18 will be coextensive and second treatment zone 4 will comprise a portion of the trough.

The quantity of sodium hydroxide employed to contact the brine containing the carbonate solids is also not critical and may vary widely. Preferably, an amount of sodium hydroxide is employed which is at least equivalent to the amount stoichiometrically required to react with quantity of magnesium impurities dissolved in the brine, and most preferably at least about 0.1 gpl excess of the stoichiometric quantity of sodium hydroxide.

When, as in the illustrated embodiment, the solids of strontium and calcium carbonate and magnesium hydroxide are removed by settling, the average residence time of liquid and solid passed to settling zone 6 will vary widely depending upon such factors as the effective settling area of zone 6, the degree of solids removal desired in zone 6, the availability and capacity of apparatus 8 for removal of residual solids and other factors. However, the average residence time of liquid and solids in settling zone 6 will generally vary from about 60 to 1,000 minutes and most preferably from about 180 to 400 minutes for most efficient operation.

For most efficient operation, the pH of the brine after addition of the selected quantity of sodium carbonate, e.g. in first treatment zone 2, is preferably from about 10 to 12, and the pH of brine after addition of the selected amount of sodium hydroxide, e.g. that brine exiting second treatment zone 4, is between 10.5 and 12.5. The pH of the brine contained in first treatment zone 2 will be adjusted by the sodium carbonate addition.

In case the quantity of magnesium in raw brine should be too low and therefore the magnesium hydroxide formed is insufficient for flocculating all the strontium and calcium carbonate present in the suspension fed to settling zone 4, a conventional coagulant of any known type may be introduced into settling zone 6 either directly or by introduction of the coagulant into the brine in zone 4 prior to its introduction into zone 6. The amount of coagulant is of conventional quantities. For instance from 0.0001 to 0.0002 grams per liter of Praestol 2750 or Praestol 2935 per liter of brine may be added. Preferably, the coagulant is added when the raw brine contains less than 0.001 weight percent of dissolved magnesium, calculated as $MgCl_2$.

As mentioned previously, brine may be withdrawn via line 22 from settling zone 6 and passed to subsequent treatment for removal of any residual solids. Thus, apparatus 8 for these residual solids may comprise conventional filtering devices, thereby producing a purified brine withdrawn via line 28 which contains the desired low quantity of dissolved strontium, calcium and magnesium impurities. While the concentration of these dissolved impurities may vary widely, the purified brine perferably contains less than about 1 ppm strontium, less than about 10 ppm calcium and less than about 1 ppm of magnesium, and most preferably less than about 0.5 ppm strontium, less than about 4 ppm calcium and less than about 0.3 ppm magnesium, calculated as elemental strontium, calcium and magnesium, respectively.

If it is desired to produce solid sodium chloride from the purified brine withdrawn via line 28, the brine may be transferred to conventional apparatus, such as a conventional evaporator-crystallizer (e.g., a multiple effective evaporator). Any build-up of sulfate solids or dissolved sulfate in a multiple-effect evaporator may be easily removed by purging a side stream of brine from the last stage in the multiple-effect evaporator in order to keep the sulfate concentrations in balance and prevent sulfate from building up in the system. The quantity of any side stream withdrawn for sulfate control should be sufficient to withdraw sulfate in an amount approximately equivalent to the sulfate introduced to the purification system by the raw brine.

The concentration of solids in the brine containing sodium carbonate and calcium carbonate withdrawn from first treatment zone 2 will generally vary from about 1 to 50 grams per liter, inclusive of the recycle solids. The concentration of solids in the brine introduced to settling zone 6 will generally vary from about 1.1 to 60 grams per liter, inclusive of the recycle solids. The concentration of solids in the brine withdrawn from settling zone 6 via line 22 will generally vary up to about 1 gram per liter.

While the foregoing discussion has only considered use of sodium carbonate and sodium hydroxide in the treatment of the raw brine, it should also be understood that potassium carbonate and potassium hydroxide may also be employed in the treatment of the brine. While the potassium carbonate and potassium hydroxide are more expensive, they are equally as beneficial in the practice of the present invention.

Apparatus which may be employed in the practice of the present invention are conventional and their description is not essential here. Thus, vessels of conventional design and construction may be employed in providing apparatus in which to house first treatment zone 2, second treatment zone 4 and settling zone 6. Moreover, a series of vessels may be employed subsequent to the vessel housing first treatment zone 2 in order to provide reaction tanks in which the brine admixed with sodium carbonate is allowed to remain to provide sufficient residence time in which to react dissolved strontium and calcium impurities with sodium carbonate prior to passage to second treatment zone 4 for contact with sodium hydroxide.

It should be understood that the solids recycled to the carbonation step may also contain small quantities, e.g. up to about 1 weight percent, of solids other than strontium carbonate, calcium carbonate and magnesium hydroxide, due to reaction of other dissolved brine impurities with the sodium carbonate or sodium hydroxide which is added.

The process for the present invention may be further illustrated by reference to the following examples wherein parts are by weight unless otherwise indicated:

EXAMPLE 1

To determine the effect of sodium carbonate excesses, carbonate reaction times and various levels of muds recycle on the removal of strontium and calcium from brine, separate runs are made in which 200 ml. samples of raw brine containing 25 weight percent sodium chloride, 228 ppm calcium (calculated as elemental calcium) and 15 ppm strontium compounds (calculated as elemental strontium) are contacted with the selected quantity of sodium carbonate and stirred in a 250 ml. container at approximately 300 rpm for the selected period of time to provide reaction of the sodium carbonate with dissolved calcium and strontium impurities to form strontium carbonate and calcium carbonate solids. In each run, sodium carbonate was added in an amount to provide the desired excess sodium carbonate over that stoichiometrically required to react with the dissolved strontium and calcium impurities. In the runs which employed muds recycle, a selected quantity of muds having the following analysis (dry basis) are added along with the sodium carbonate to the brine:

$Sr^{++}$ — 2 wt. %;
$Mg^{++}$ — 10 wt. %;

$Ca^{++}$ — 29 wt. %;
$CO_3^{--}$ — 45 wt. %;
$OH^-$ — 14 wt. %.

At the end of the carbonation reaction time, a selected quantity (0.01 grams) of sodium hydroxide (as a 4 gpl aqueous solution) is added to each sample and the sample is slowly stirred (about 60 rpm) for one minute, after which the sample is allowed to stand for 6 hours. The amount of sodium hydroxide added is such that a final excess of 0.2 gram per liter sodium hydroxide is achieved. At the end of the 6 hour period, each sample is filtered through Whatman No. 42 filter paper and the filtered brine analyzed for calcium and strontium.

The results obtained from the runs are set forth in Table I below wherein the amount of muds recycle is expressed as % muds:

TABLE I

| Amount of Muds Recycle (%) | Carbonate Reaction Time (min) | Sodium Carbonate Excess (g/l) | Impurities in Filtered Brine | |
|---|---|---|---|---|
| | | | Sr (ppm) (calculated as elemental Sr) | Ca (ppm) (calculated as elemental Ca) |
| | | 0.3 | 8.0 | 9.2 |
| 0 | 45 | 0.6 | 5.2 | 4.8 |
| | | 0.9 | 4.6 | 4.8 |
| | | 0.3 | 5.6 | 9.0 |
| 0 | 90 | 0.6 | 2.6 | 3.8 |
| | | 0.9 | 1.8 | 2.0 |
| | | 0.3 | 7.0 | 8.6 |
| 0 | 23 | 0.6 | 4.2 | 5.0 |
| | | 0.9 | 3.6 | 4.2 |
| | | 0.3 | 2.5 | 9.8 |
| 100 | 45 | 0.6 | 1.0 | 4.2 |
| | | 0.9 | 0.8 | 3.4 |
| | | 0.3 | 1.6 | 7.0 |
| 300 | 45 | 0.6 | 0.8 | 3.4 |
| | | 0.9 | 0.6 | 2.2 |
| | | 0.3 | 1.2 | 5.8 |
| 300 | 90 | 0.6 | 0.5 | 2.8 |
| | | 0.9 | 0.4 | 3.0 |

As may be seen from Table I, the quantity of dissolved strontium impurity in the final filtered brine is significantly less when muds recycle is employed, and the quantity of calcium is generally also reduced.

EXAMPLE 2

To a stirred (about 30 rpm) 1,500 gallon mixing tank are continuously added (1) 150 gallons per minute of a raw brine containing about 25 weight percent sodium chloride and 173 ppm calcium, 72 ppm magnesium and 16 ppm strontium dissolved impurities (calculated as elemental calcium, magnesium and strontium, respectively), (2) sufficient brine containing about 25 weight percent sodium chloride, saturated with sodium carbonate and containing 25% by weight sodium carbonate solids, to provide a sodium carbonate excess relative to the raw brine of 0.5 gpl, and (3) muds recycled from a clarifier in an amount of about 600% solids. The solids thus recycled have the following analysis (dry basis):
$Sr^{++}$ — 3 wt. %;
$Mg^{++}$ — 11 wt. %;
$Ca^{++}$ — 27 wt. %;
$CO_3^{--}$ — 43 wt. %;
$OH^-$ — 16 wt. %.

Brine is withdrawn from the first tank at a rate sufficient to provide an average residence time therein of 9.5 minutes. The withdrawn brine, to which the sodium carbonate and muds have been added, is passed to a series of two 3,000 gallon reaction tanks, each of which are stirred at about 13 rpm. Brine is allowed to remain in each of these two tanks for an average residence time of 19 minutes, to complete the formation of strontium carbonate and calcium carbonate.

Brine containing these strontium and calcium solids is withdrawn from the last 3,000 gallon reaction tank and passed to a trough wherein an aqueous sodium hydroxide solution containing 10% by weight NaOH is added in an amount sufficient to provide a sodium hydroxide excess of about 0.2 gpl. The brine to which the sodium hydroxide is added is passed to a 37,500 gallon clarifier which is stirred at a rate of about 4 rpm, producing an essentially clear brine containing a total of 1.8 ppm calcium, 1.2 ppm magnesium and 0.4 ppm strontium (dissolved plus suspended solids; calculated as the elements). The clear brine is passed to a pressure tube filter for removal of substantially all residual solids, thereby producing a final, filtered brine containing a total of 1.0 ppm calcium, 0.3 ppm magnesium and 0.3 ppm strontium, calculated as the elements.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

We claim:

1. In a brine treatment process for removing dissolved strontium, calcium and magnesium impurities from a raw sodium chloride brine containing the same wherein the raw brine is contacted with sodium carbonate for formation of strontium carbonate and calcium carbonate solids, the brine containing the carbonate solids is contacted with sodium hydroxide for formation of magnesium hydroxide solids, and at least a major portion of said strontium carbonate, calcium carbonate and magnesium hydroxide solids is removed from the brine to produce a purified brine, and the brine is thereafter subjected to electrolysis in an electrolytic mercury cell, the improvement which comprises recycling said removed solids, in an amount of from about 25 to 1000% of the solids produced, for admixture with said raw brine and sodium carbonate.

2. The process of claim 1 wherein sodium carbonate is employed to contact the raw brine in an amount sufficient to provide at least about 0.1 gpl excess sodium carbonate.

3. The process of claim 1 wherein sodium hydroxide is employed to contact said brine containing carbonate solids in an amount sufficient to provide at least about 0.1 gpl excess sodium hydroxide.

4. The process of claim 1 wherein the pH of said brine containing carbonate solids is from about 10 to 12.

5. The process of claim 1 wherein the pH of brine containing strontium carbonate, calcium carbonate and magnesium hydroxide is from about 10.5 to 12.5.

6. The process of claim 1 wherein the raw brine is contacted with said sodium carbonate and said recycled solids in a first treatment zone to form strontium carbonate and calcium carbonate solids, and the brine containing the carbonate solids is withdrawn from the first treatment zone and passed to a second treatment zone for contact with said sodium hydroxide to form said magnesium hydroxide solids.

7. The process of claim 6 wherein the brine containing the strontium carbonate, calcium carbonate and magnesium hydroxide solids is withdrawn from said second treatment zone and passed to a settling zone wherein strontium carbonate, calcium carbonate and magnesium hydroxide solids are removed by settling, and a portion of said removed settled solids are employed as said recycled solids, said recycled solids being passed to said first treatment zone.

8. The process of claim 6 wherein the raw brine contains from about 1 to 200 ppm dissolved strontium impurities, from about 100 to 6,000 ppm dissolved calcium impurities and from about 10 to 600 ppm dissolved magnesium impurities, calculated as elemental strontium, calcium and magnesium, respectively.

9. The process of claim 6 wherein sodium carbonate is added to the first treatment zone as sodium chloride brine saturated with sodium carbonate and containing up to 25 weight percent sodium carbonate solids.

10. The process of claim 6 wherein the purified brine is withdrawn from the settling zone and filtered to remove residual solids.

11. The process of claim 10 wherein the filtered brine contains less than about 1 ppm strontium, less than about 10 ppm calcium and less than about 1 ppm magnesium impurities, calculated as elemental strontium, calcium and magnesium, respectively.

* * * * *